(12) United States Patent
Mpongo

(10) Patent No.: US 9,994,334 B2
(45) Date of Patent: Jun. 12, 2018

(54) AIRCRAFT LOCATING DEVICE

(71) Applicant: David Mpongo, Cary, NC (US)

(72) Inventor: David Mpongo, Cary, NC (US)

(*) Notice: Subject to any disclaimer, the term of this patent is extended or adjusted under 35 U.S.C. 154(b) by 0 days. days.

(21) Appl. No.: 14/938,175

(22) Filed: Nov. 11, 2015

(65) Prior Publication Data

US 2016/0152346 A1  Jun. 2, 2016

Related U.S. Application Data

(60) Provisional application No. 62/085,387, filed on Nov. 28, 2014.

(51) Int. Cl.
*B64D 47/06* (2006.01)
*A62B 1/00* (2006.01)

(52) U.S. Cl.
CPC ............... *B64D 47/06* (2013.01); *A62B 1/00* (2013.01)

(58) Field of Classification Search
CPC ........................................................ B63B 22/10
See application file for complete search history.

(56) References Cited

U.S. PATENT DOCUMENTS

| | | | |
|---|---|---|---|
| 806,730 A * | 12/1905 | Zoll | B63B 22/10 43/23 |
| 2,470,783 A * | 5/1949 | Mead | B64C 35/00 116/210 |
| 2,608,043 A | 8/1952 | Berdan | |
| 2,938,323 A | 5/1960 | Livingston et al. | |
| 3,192,693 A | 7/1965 | Bergeson | |
| 5,167,108 A | 12/1992 | Bird | |
| 5,174,100 A | 12/1992 | Wassenberg | |
| 6,601,374 B2 | 8/2003 | Smith | |
| 2005/0044834 A1 | 3/2005 | Appleyard | |
| 2013/0070556 A1* | 3/2013 | Huskamp | G01S 15/06 367/6 |

* cited by examiner

*Primary Examiner* — Brian M O'Hara
(74) *Attorney, Agent, or Firm* — Global Intellectual Property Agency, LLC; Jordan Sworen

(57) ABSTRACT

An aircraft locating device for locating an aircraft that has crashed into a body of water. The aircraft locating device includes a housing having a base, one or more sidewalls, an upper wall, defining an interior volume, wherein at least one wall can be secured to an aircraft. The housing includes one or more openings removably covered by one or more gates that open when the housing is submerged in liquid. A plurality of buoyant objects are disposed in the interior volume of the housing, wherein the buoyant objects can be released therefrom when the gates are open, thereby leaving a visual trail in a body of water in order to allow emergency responders to identify where an aircraft may be located.

4 Claims, 3 Drawing Sheets

AIRCRAFT LOCATING DEVICE

CROSS REFERENCE TO RELATED APPLICATION

This application claims the benefit of U.S. Provisional Application No. 62/085,387 filed on Nov. 28, 2014. The above identified patent application is herein incorporated by reference in its entirety to provide continuity of disclosure.

BACKGROUND OF THE INVENTION

Field of the Invention

The present invention relates to locating devices. More specifically, the present invention provides an aircraft locating device comprising a plurality of buoyant objects disposed within an interior volume of a housing, wherein the buoyant objects are adapted to be released from the housing when submerged in liquid, thereby leaving a visual trail of floating material above a body of water in order to allow emergency responders to identify the location of a submerged aircraft.

Many vessels such as aircrafts, rockets, boats and the like can become lost or crash over a body of water. In such circumstances, the vessel may sink below the surface of the water or travel to a remote location in which rescuers are not accustomed to searching, thereby making it difficult for emergency responders to identify the location of the vessel. Conventional locating devices may be rendered useless if attached directly to the vessel via a cable or require power to operate if the vessel is ends up in a remote location. Furthermore, the current of the water can relocate the crashed vessel a far distance from the crash site, in which a single rescue beacon released at the location of the crash site is no longer useful for locating the vessel. Therefore, there exists a need in the prior art for a device that can release a plurality of buoyant objects in a continuous manner that enables a user to easily identify the location of an aircraft or other vessel.

Devices have been disclosed in the prior art that relate to locating devices. These include devices that have been patented and published in patent application publications. These devices generally relate to floating objects adapted to provide a visual or electronic means for locating an underwater vessel, such as U.S. Pat. No. 4,619,066, U.S. Pat. No. 8,727,263, U.S. Pat. No. 2,470,783, U.S. Pat. No. 4,836,815, U.S. Pat. No. 4,433,638, and U.S. Pat. No. 8,766,820.

These prior art devices have several known drawbacks. The devices in the prior art provide floatation objects adapted to be released from a housing, wherein the flotation object is manually connected to a sinking object. However, the the length of the connection may be limiting depending on the depth of the body of water in which the object in located. Another device disclosed in the prior art comprises a beacon that floats on water, and emits lights or radio signals therefrom. However, these devices fail to provide a housing that releases a plurality of buoyant objects when exposed to liquid, wherein the buoyant objects are adapted to leave a visual trail within a body of water in order to enable emergency rescue to easily locate a vessel submerged in a body of water.

In light of the devices disclosed in the prior art, it is submitted that the present invention substantially diverges in design elements from the prior art and consequently it is clear that there is a need in the art for an improvement to existing aircraft locating devices. In this regard the instant invention substantially fulfills these needs.

SUMMARY OF THE INVENTION

In view of the foregoing disadvantages inherent in the known types of aircraft locating devices now present in the prior art, the present invention provides a new aircraft locating device wherein the same can be utilized for providing convenience for the user when locating an aircraft that has crashed in a body of water.

It is therefore an object of the present invention to provide a new and improved aircraft locating device that has all of the advantages of the prior art and none of the disadvantages.

It is another object of the present invention to provide an aircraft locating device comprising a housing having a base, one or more sidewalls, and an upper wall, defining an interior volume, wherein at least one walls is adapted to secure to an aircraft.

Another object of the present invention is to provide an aircraft locating device comprising a plurality of buoyant objects disposed within the interior volume of the housing.

Yet another object of the present invention is to provide an aircraft locating device comprising one or more gates disposed on the housing and adapted to open once submerged in liquid in order to release the buoyant objects in a continuous manner in order to leave a visible trail for emergency responders to follow in order to locate a crashed aircraft or other vessel.

Yet another object of the present invention is to provide an aircraft locating device wherein each gate comprises a water soluble layer removably covering an opening, wherein the water soluble layer is adapted to dissolve when submerged in liquid.

Another object of the present invention is to provide an aircraft locating device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
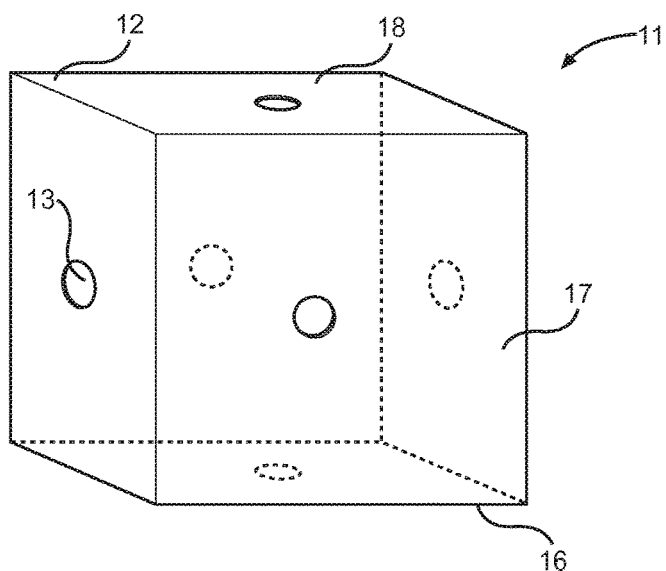
FIG. 1 shows a perspective view of the housing of the aircraft locating device.

Reference is made herein to the attached drawings. Like reference numerals are used throughout the drawings to depict like or similar elements of the aircraft locating device. For the purposes of presenting a brief and clear description of the present invention, the preferred embodiment will be discussed as used for locating a crashed aircraft or other vessel. The figures are intended for representative purposes only and should not be considered to be limiting in any respect.

Referring now to FIG. 1, there is shown a perspective view of the housing of the aircraft locating device. The aircraft locating device 11 comprises a housing 12 and a plurality of buoyant objects stored within an interior volume of the housing 12. The illustrated housing 12 is configured to be secured to an aircraft or other vessel that travels over a body of water. For example, the housing 12 may be secured to an interior compartment of an aircraft. In alternate embodiments, the housing 12 is integral to the interior of an aircraft, such as forming a pocket within the aircraft. In the event that the aircraft crashes into a body of water, the buoyant materials are released from the housing 12 and leave a visual trail on the water for emergency responders to follow in order to locate the sinking aircraft.

The housing comprises at least a rear wall and a front wall, forming an interior volume therein. In the illustrated embodiment, the housing 12 comprises a base 16, one or more sidewalls 17, and an upper wall 18, defining an interior volume. In the illustrated embodiment, the housing 12 comprises a substantially cube shape having a square cross section. However, in other embodiments, the housing 12 may comprise any suitable configuration that is able to store buoyant objects therein. At least one wall 16, 17, 18 of the housing 12 is adapted to be secured to a support surface an aircraft by any suitable fastener, such as screws.

The housing 12 further comprises one or more openings 13 thereon, wherein the openings 13 allow buoyant objects stored within the interior volume of the housing 12 to escape from the housing 12. In the illustrated embodiment, the openings 13 are circular in shape, however, alternate embodiments the openings 13 comprise any suitable shape, such as square, triangular, or rectangular shape. In other embodiments, the openings 13 may be disposed in any configuration and position on the housing 12. Preferably, an opening 13 is disposed on each of the sidewalls 17, the base 16, and the upper wall 18 in order to ensure at least one opening 13 is exposed in the event an aircraft crashes and one or more sides of the housing are covered by debris.

Figure 2:
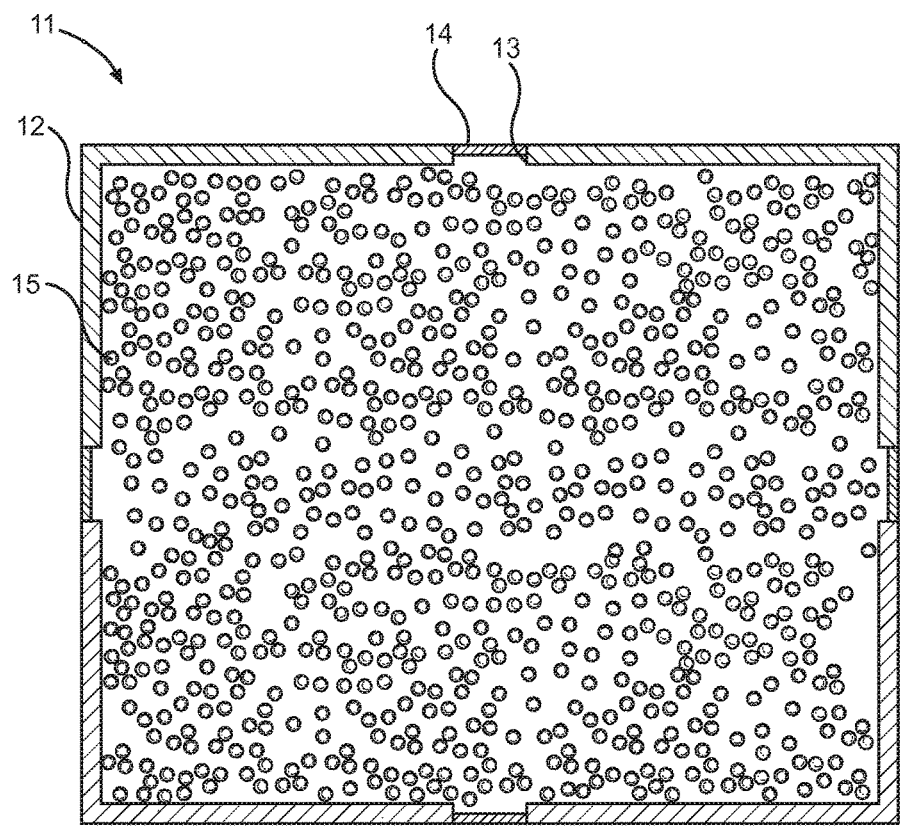
FIG. 2 shows a cross sectional view of the aircraft locating device.
Figure 3:
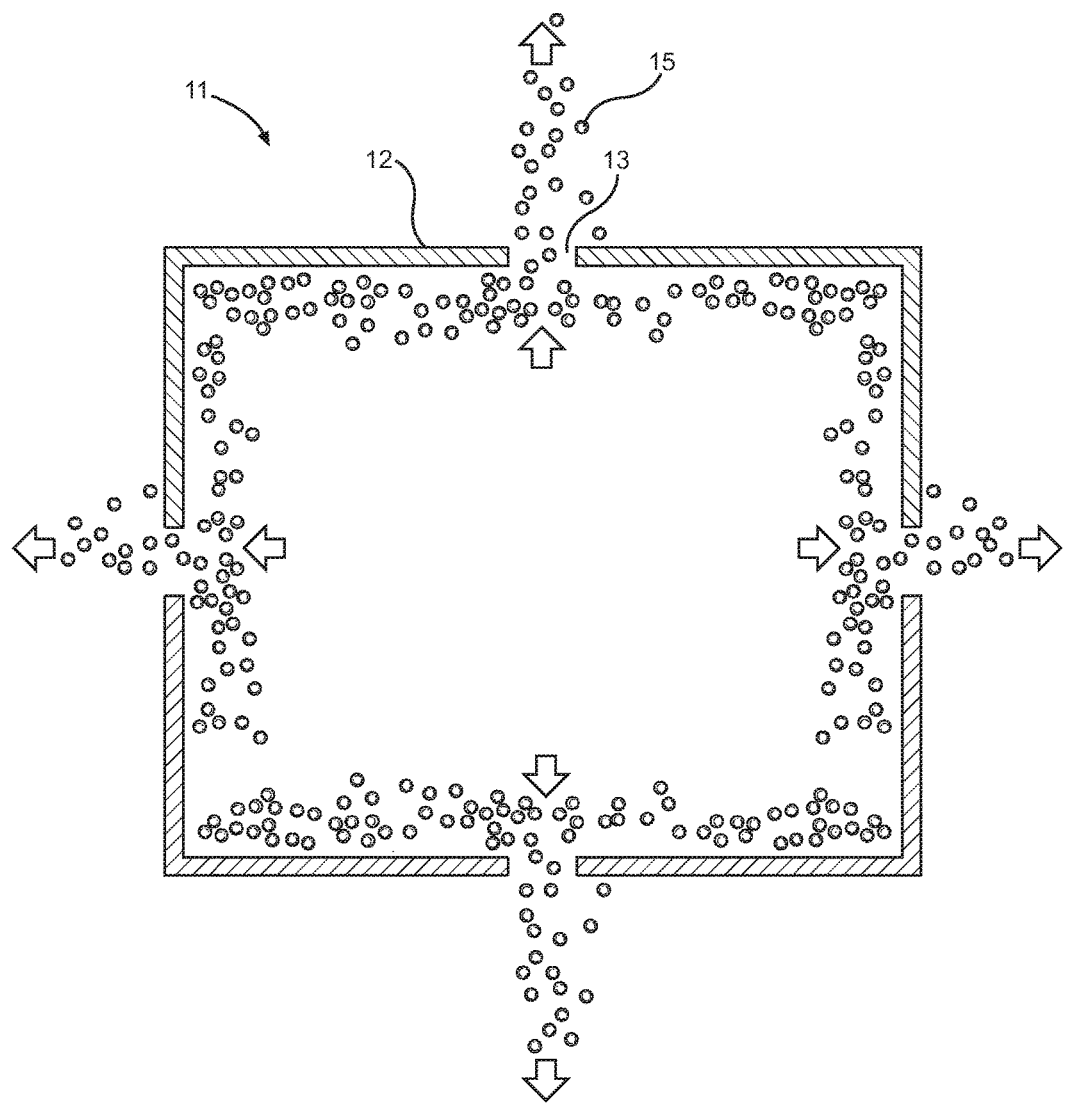
FIG. 3 shows a cross sectional view of the aircraft locating device wherein the buoyant objects are released from the housing.

Referring now to FIGS. 2 and 3, there is shown a cross sectional view of the aircraft locating device and a cross sectional view of the aircraft locating device wherein the buoyant objects are positioned for release from the housing, respectively. The aircraft locating device 11 further comprises a gate 14 disposed over each opening 13 of the housing 12. The gate 14 is adapted to removably cover the opening 13 in order to prevent the buoyant objects 15 from leaving the housing 12 prematurely. In the illustrated embodiment, the buoyant objects 15 are spherical in shape, wherein the buoyant objects 15 are adapted to fill the interior volume of the housing. However, the buoyant objects 15 can comprise any suitable shape adapted to fit through the opening 13 of the housing 12. In some embodiments, the buoyant objects 15 are brightly colored and reflective in order to allow emergency responders to easily view location thereof.

The dimension of the opening 13 and the dimension of the buoyant objects 15 are factors that contribute to the rate of release of the buoyant objects 15 from the housing 12. The dimension of the buoyant objects 15 is adapted to allow the buoyant objects 15 to continually release from the housing 12 until the aircraft reaches its final resting position at the bottom of a body of water. The buoyant objects 15 can be composed of any suitable buoyant material, such as foam, wherein at least part of the buoyant object 15 floats above the water. Further, the material is adapted to be non-toxic in order to prevent damage to marine life within the body of water.

Preferably, the gate 14 is adapted to open when submerged in liquid. In the illustrated embodiment, the gate 14 comprises a water soluble layer disposed over each opening 13, wherein the water soluble layer is adapted to dissolve when submerged in water. In other embodiments, the gate 14 can comprise any suitable removable covering disposed over an opening 13, wherein the gate 14 is water sensitive and adapted to uncover the opening 13 when submerged in water.

The dimension of the water soluble layer is substantially the same dimension of the opening 13 in order to prevent buoyant objects 15 leaving therefrom. The water soluble layer is attached to the housing 12 by any suitable means, such as adhesive disposed between the water soluble layer and the perimeter of the opening 13. Any suitable water soluble material may be used, such as material derived from hydrolyzed vinyl acetate copolymer resins, wherein the material readily dissolves when submerged in water. Once the water soluble layer dissolves, the buoyant objects 15 are released through the openings 13 of the housing 12.

Figure 4:
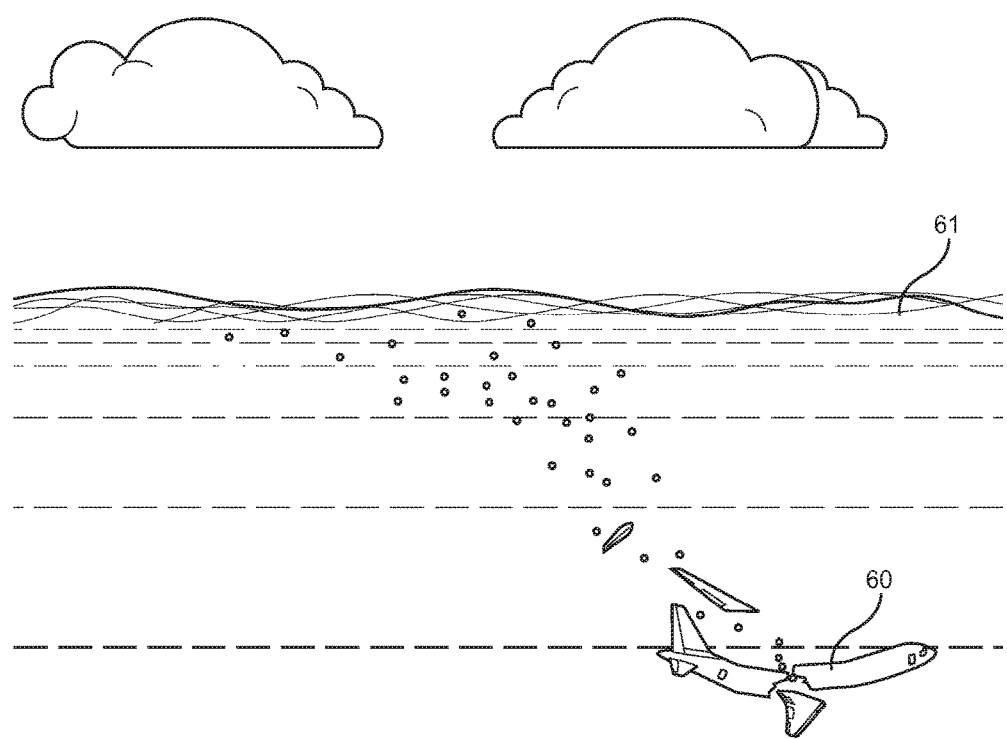
FIG. 4 shows a perspective view of the aircraft locating device in use.

Referring now to FIG. 4, there is shown a perspective view of the aircraft locating device in use. In operation, the housing of the aircraft locating device is secured to the interior of an aircraft 60 or other vessel adapted to travel over a body of water 61. In the event the aircraft 60 crashes into the body of water 61, the water soluble layers disposed over the openings of the housing will dissolve, thereby releasing the buoyant objects 15 positioned within the interior volume thereof. The buoyant objects 15 will rise to the surface of the body of water 61 as the aircraft 60 descends therebeneath. As each buoyant object 15 exits the housing, they will leave a visual trail on the surface of the water as the current from the body of water or other environmental factors, such as the wind, move the buoyant objects away from the aircraft 60. The visual trail of buoyant materials will allow emergency responders to follow the trail in order to locate the final resting position of the aircraft 60. In use, a plurality of aircraft locating devices are positioned throughout the interior of an aircraft 60 to ensure the release of the buoyant objects 15 regardless of where the aircraft 60 opens or separates after a crash.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aircraft locating device, comprising:
    a housing having a base, a sidewall, and an upper wall, defining a static structure forming an interior volume, wherein the housing is configured to be secured to an interior support surface of an aircraft;
    a plurality of buoyant objects freely disposed within said interior volume of said housing;
    an opening disposed on each of the base, the sidewall, and the upper wall of said housing, wherein each opening outwardly faces a unique direction, configured to receive said plurality of buoyant objects therethrough;
    a water soluble gate configured to dissolve when submerged in a body of water, wherein said water soluble gate covers said opening and is affixed to said housing,
    where upon dissolution of the water soluble gate, the plurality of buoyant objects continuously release from at least one opening.

2. The aircraft locating device of claim 1, wherein said plurality of buoyant objects are composed of foam.

3. The aircraft locating device of claim 1, wherein the water soluble gate is only disposed over each opening.

4. The aircraft locating device of claim 1, wherein the plurality of the buoyant objects comprise the same size as one another.

* * * * *